(12) United States Patent
Lin et al.

(10) Patent No.: US 7,443,477 B2
(45) Date of Patent: Oct. 28, 2008

(54) IN-PLANE SWITCHING LIQUID CRYSTAL DISPLAY

(75) Inventors: Jiunn-Shyong Lin, Yangmei Town (TW); Po-Sheng Shih, Yangmei Town (TW); Kei-Hsiung Yang, Yangmei Township, Taoyuan County (TW); Tai-Shun Liao, Yangmei Town (TW)

(73) Assignee: Hannstar Display Corporation, Taipei (TW)

( * ) Notice: Subject to any disclaimer, the term of this patent is extended or adjusted under 35 U.S.C. 154(b) by 298 days.

(21) Appl. No.: 11/220,021

(22) Filed: Sep. 6, 2005

(65) Prior Publication Data

US 2007/0052899 A1 Mar. 8, 2007

(51) Int. Cl.
*G20F 1/1343* (2006.01)

(52) U.S. Cl. .................. 349/141; 349/110; 349/111; 349/39

(58) Field of Classification Search .............. None
See application file for complete search history.

(56) References Cited

U.S. PATENT DOCUMENTS

| | | | |
|---|---|---|---|
| 6,069,678 A * | 5/2000 | Sakamoto et al. ........... | 349/141 |
| 6,693,687 B2 | 2/2004 | Ohta et al. | |
| 6,839,115 B2 | 1/2005 | Hong et al. | |
| 2002/0024626 A1 * | 2/2002 | Lee et al. .................. | 349/141 |
| 2002/0131003 A1 * | 9/2002 | Matsumoto ................ | 349/139 |
| 2003/0174269 A1 * | 9/2003 | Tanaka et al. .............. | 349/129 |
| 2004/0135939 A1 * | 7/2004 | Luo ........................ | 349/110 |
| 2004/0263710 A1 * | 12/2004 | Song et al. ................ | 349/44 |

* cited by examiner

*Primary Examiner*—David C. Nelms
*Assistant Examiner*—Lucy P Chien
(74) *Attorney, Agent, or Firm*—Volpe and Koenig, P.C.

(57) ABSTRACT

An in-plane switching liquid crystal display, especially relative to an in-plane switching liquid crystal display with the absence of an overcoat layer is provided. The in-plane switching liquid crystal display having a first substrate, a second substrate and a liquid crystal layer sandwiched therebetween, a plurality of gate lines and data lines disposed on the first substrate, a counter electrode disposed on the second substrate and corresponding to one of the data lines, a pixel having a pixel electrode, a pair of shielding electrodes and a common electrode also disposed on the first substrate. Through the arrangement of shielding electrodes as well as the counter electrode, the coupling effect of the applied pixel voltage on the data lines is shielded.

19 Claims, 18 Drawing Sheets

IN-PLANE SWITCHING LIQUID CRYSTAL DISPLAY

FIELD OF THE INVENTION

The present invention relates to a liquid crystal display (LCD), and more particularly to an in-plane switching (IPS) LCD.

BACKGROUND OF THE INVENTION

The liquid crystal display (LCD) has been broadly used in various applications in the daily life with the improvement and popularity of the digital network technology. Nowadays, the image quality of the LCD is nip and tuck with that of the cathode ray tube (CRT) display. However, there are still some problems for the LCD needed to be improved and solved, such as the small viewing angle and the non-uniform displaying.

Many techniques are developed for obtaining a wider viewing angle for the LCD, among which the in-plane switching (IPS) mode is regarded as an excellent technique to achieve the mentioned purpose. It is known that, however, the IPS LCD is disadvantageous in lower aperture ratio and color shift. In order to resolve the color shift of the IPS LCD, various improved LCD structures, e.g. the super IPS LCD (S-IPS LCD) and the advanced super IPS LCD (AS-IPS LCD), are respectively developed to enhance the aperture ratio.

Please refer to FIGS. 1A and 1B, relating to a plan view and a cross-sectional view schematically showing the structure of an S-IPS LCD disclosed in U.S. Pat. No. 6,839,115 B2. As shown in FIGS. 1A and 1B, gate lines 111 and data lines 112 are respectively arranged in longitudinal and transverse directions on a first transparent substrate 11 so as to define a pixel area of the S-IPS LCD. The pixel area includes plural first common electrode 113 and plural pixel electrodes 114, wherein some of the pixel electrode 114 and some of the first common electrode 113 are overlapped in the peripheral region A of the pixel area, which is further enlarged for a clear description in FIG. 1B. A second common electrode 115 is positioned to overlap some of the pixel electrode 114 that overlaps some of the first common electrode 113, and is connected to the first common electrode 113 through a contact hole 116. On a second substrate 12 facing to the first substrate 11, a black matrix 121 is arranged, so as to prevent the light from leaking. In this case, the first common electrodes 113 as well as the second common electrode 115 adjacent thereto operate for shielding the pixel electrodes 114 from the effects of a data voltage on an adjacent one of the data lines 112. However, such a structure of the S-IPS LCD still needs to be improved since it is difficult to suppress the local crosstalk caused by the capacitive coupling between the pixel electrodes 114 and the data lines 112.

On the other hand, it is possible for the AS-IPS LCD to achieve a higher aperture ratio. Please refer to FIG. 2, which is a cross-sectional view schematically showing the layer sequence of the AS-IPS LCD disclosed in U.S. Pat. No. 6,693,687 B2. The AS-IPS LCD includes a first substrate 21 and a second substrate 22 having a black matrix 221 which are faced to each other, while a liquid crystal layer 23 is disposed therebetween. The orientation films 24 and 25 are mounted on respective surfaces of the inner sides of the substrates 21 and 22.

On the first substrate 21, the drain lines 211 composed of a conductive layer are arranged and corresponded to the black matrix 221, which operate as image signal lines for the display. The common electrodes comprises a first portion 212 and a second portion 214. The first portion 212 made of a transparent conductive layer is formed for shielding and completely covers the drain line 211, so as to completely eliminate the leakage electric field from the drain line 211 and thus the crosstalk. Beside, the pixel electrodes 213, 215 as well as the second portion 214 are disposed for controlling the display. In this case, an overcoat layer 26 made of a transparent resin material is provided between the orientation film 24 and the first substrate 21, so as to reduce the capacitance between the drain line 211 and the first portion 212 which is overlapped on the drain line 211.

Through the overcoat layer in the AS-IPS LCD, the improvement of the aperture ratio and the estimation of the crosstalk are achievable. However, the application of the overcoat layer results in a significant increase in the manufacturing cost.

In order to overcome the mentioned drawbacks in the prior art, a novel in-plane switching liquid crystal display with an improved cell transmittance and a reduced production cost is provided in the present invention.

SUMMARY OF THE INVENTION

It is an aspect of the present invention to provide an in-plane switching liquid crystal display with a low production cost and a high aperture ratio.

In accordance with the aspect of the present invention, the in-plane switching liquid crystal display having a first substrate, a second substrate and a liquid crystal layer sandwiched therebetween includes a plurality of gate lines and data lines disposed on the first substrate and intersected to each other so as to form a pixel surrounded thereby, a counter electrode disposed on the second substrate and corresponding to one of the data lines, a pixel electrode disposed in the pixel and on the first substrate, a pair of shielding electrodes disposed on the first substrate, and a common electrode having a first portion and a second portion disposed on the first substrate.

Preferably, one of the data lines is located between the shielding electrodes.

Preferably, the first portion has a first slit corresponding to one of the data lines, and the second portion is located inside the pixel and adjacent to the pixel electrode.

Preferably, the first portion has a second slit corresponding to one of the gate lines.

Preferably, the first slit and the second slit are isolated to each other.

In accordance with the aspect of the present invention, the in-plane switching liquid crystal display further includes a conductive line spacing apart the gate lines.

Preferably, the shielding electrodes are connected to the conductive line.

In accordance with the aspect of the present invention, the in-plane switching liquid crystal display further includes a contact hole connecting the conductive line to the first portion.

Preferably, the conductive line is applied with a common voltage.

Preferably, the shielding electrodes are floating.

Preferably, the counter electrode is applied with one of a fixed voltage and a common voltage.

Preferably, the first portion is a transparent electrode.

Preferably, the second portion is a transparent electrode.

Preferably, the pixel electrode is a transparent electrode.

Preferably, the shielding electrodes are opaque electrodes.

Preferably, the counter electrode is an opaque electrode.

Preferably, the counter electrode is a transparent electrode.

In accordance with the aspect of the present invention, the in-plane switching liquid crystal display further includes a BM resin disposed between the second substrate and the counter electrode.

Preferably, the BM resin is zigzag-shaped.

Preferably, one of the counter electrode, the shielding electrodes, the data lines, the first portion, the second portion and the pixel electrode is zigzag-shaped.

In accordance with the aspect of the present invention, the in-plane switching liquid crystal display further includes a horizontal distance between one of the data lines and the shielding electrodes, wherein the horizontal distance is ranged from 0.1 to 10.0 μm.

In accordance with the aspect of the present invention, the in-plane switching liquid crystal display further includes a vertical distance between one of the data lines and the first portion, wherein the vertical distance is ranged from 0.1 to 2.8 μm.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
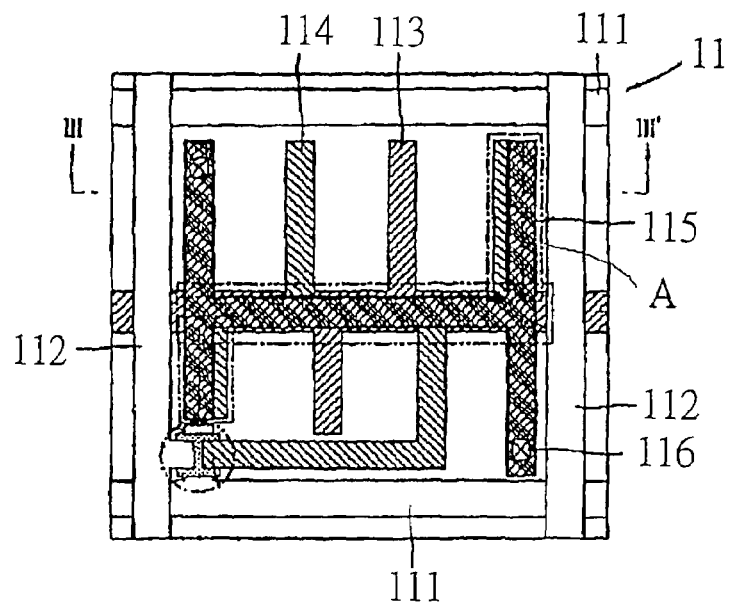
FIG. 1A is a plan view schematically showing the structure of an S-IPS LCD according to the prior art.
Figure 1B:
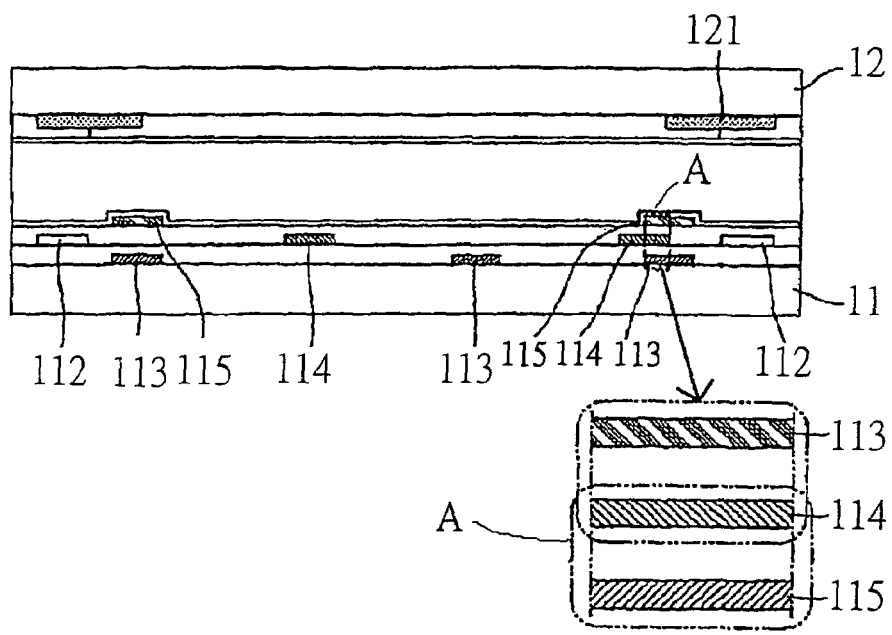
FIG. 1B is a cross-sectional view schematically showing the structure of an S-IPS LCD according to the prior art.
Figure 2:
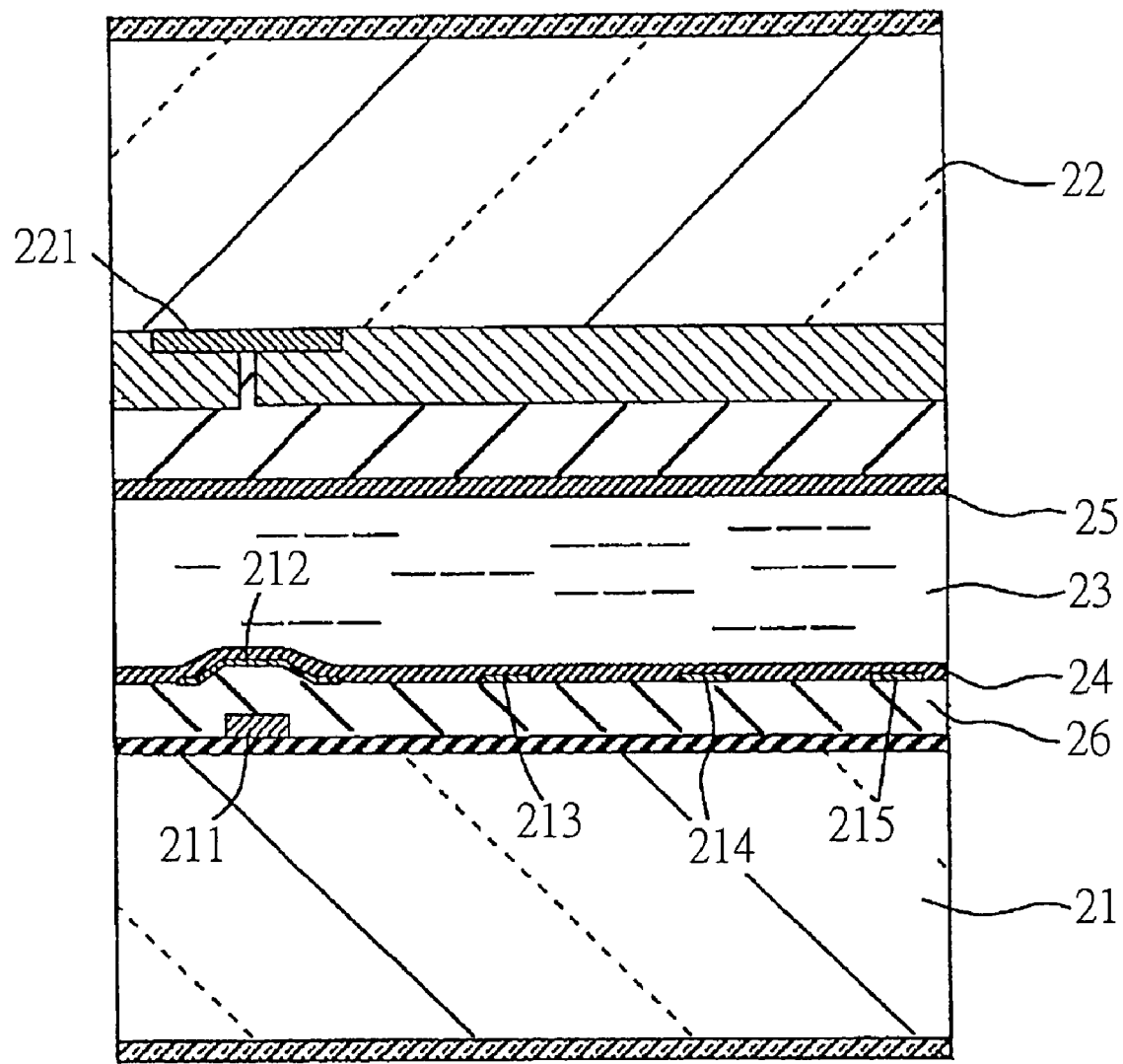
FIG. 2 is a cross-sectional view schematically showing the layer sequence of the AS-IPS LCD according to the prior art.
Figure 3:
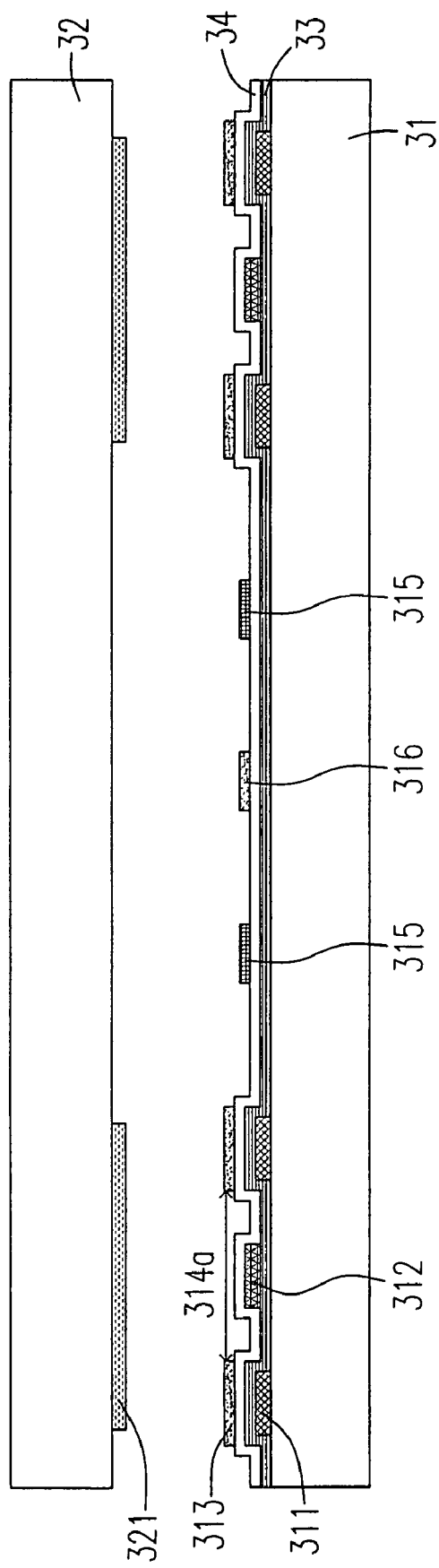
FIG. 3 is a cross-sectional view schematically showing a basic aspect of the present invention.

First of all, a basic aspect of the present invention is schematically illustrated in FIG. 3. In accordance with the invention, the in-plane switching liquid crystal display denoted as an AS-NOOC LCD includes a first substrate 31 and a second substrate 32 that are faced to each other, and therebetween a liquid crystal (LC) layer is interposed. On the first substrate 31, plural pairs of shielding electrodes 311 are formed and covered with a gate insulation layer 33. Plural data lines 312 are disposed on the gate insulation layer 33, and each of which is positioned between the respective pair of the shielding electrodes 311. Preferably, the passivation layer 34 is formed above the mentioned electrodes, so as to protect the electrodes from moisture or the like. The common electrode comprises a first portion 313 and a second portion 316. The first portion 313 are formed above the passivation layer 34 and thus the data lines 312 as well as the shielding electrodes 311, wherein each of the first portion 313 has an slit 314a corresponding to the data line 312 therebelow. Moreover, the pixel electrodes 315 are formed on the passivation layer 34 and the second portion 316 is disposed between two of the pixel electrodes 315.

On the second substrate 32, the counter electrode 321 are formed, each of which is positioned above the respective data line 312, correspondingly. In this case, the counter electrode 321 is an opaque electrode for further preventing the light leakage as a black matrix (BM), and alternatively, the counter electrode 321 is made of a transparent electrode with a black matrix (BM) resin.

The following embodiments are illustrated for clearly specifying the present invention and the effects thereof, while the scope of the invention is not limited thereto.

Figure 4A:
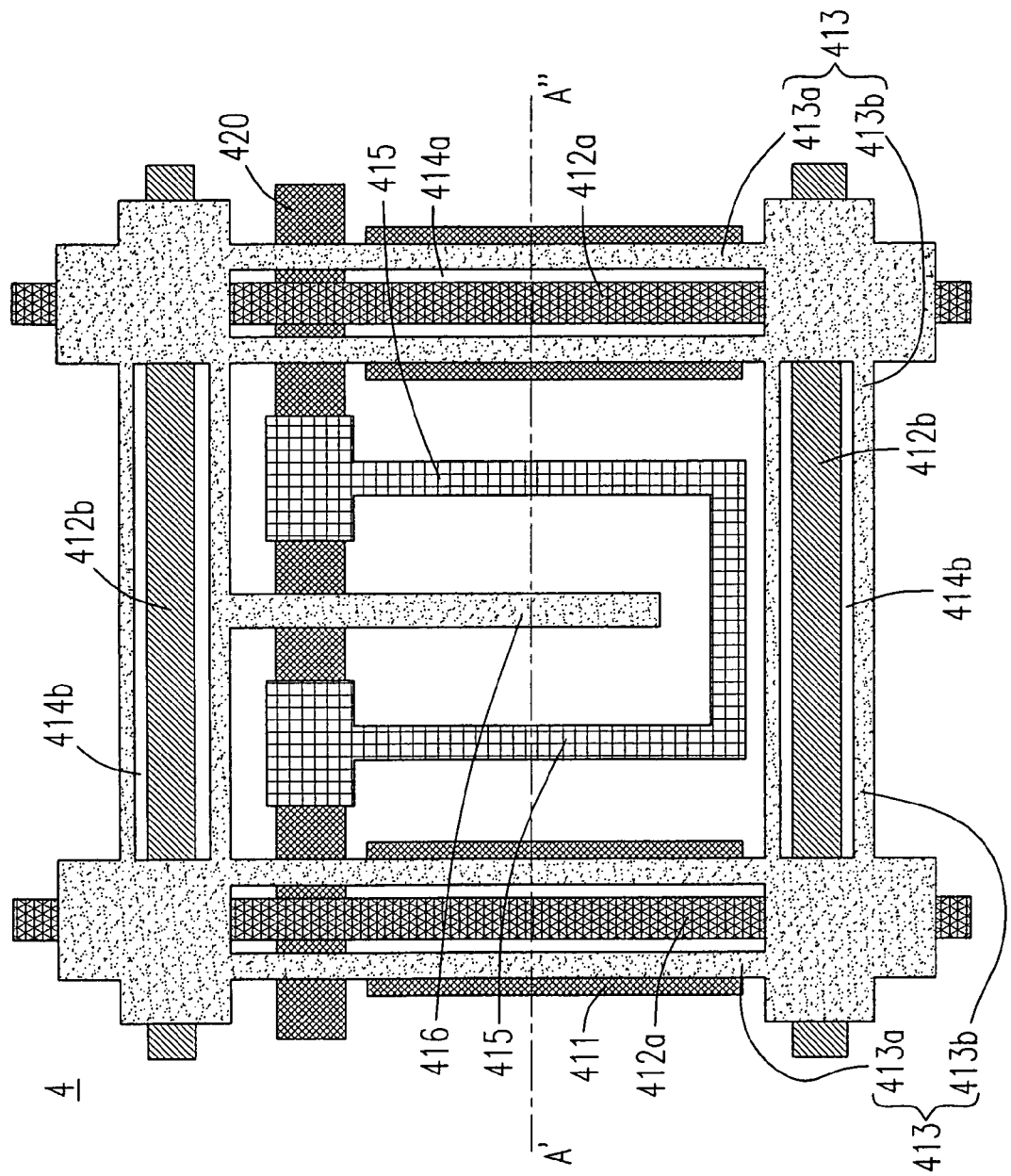
FIG. 4A and FIG. 4B are a top view and a cross-sectional view respectively showing the in-plane switching liquid crystal display according to a first embodiment of the present invention.
Figure 4B:
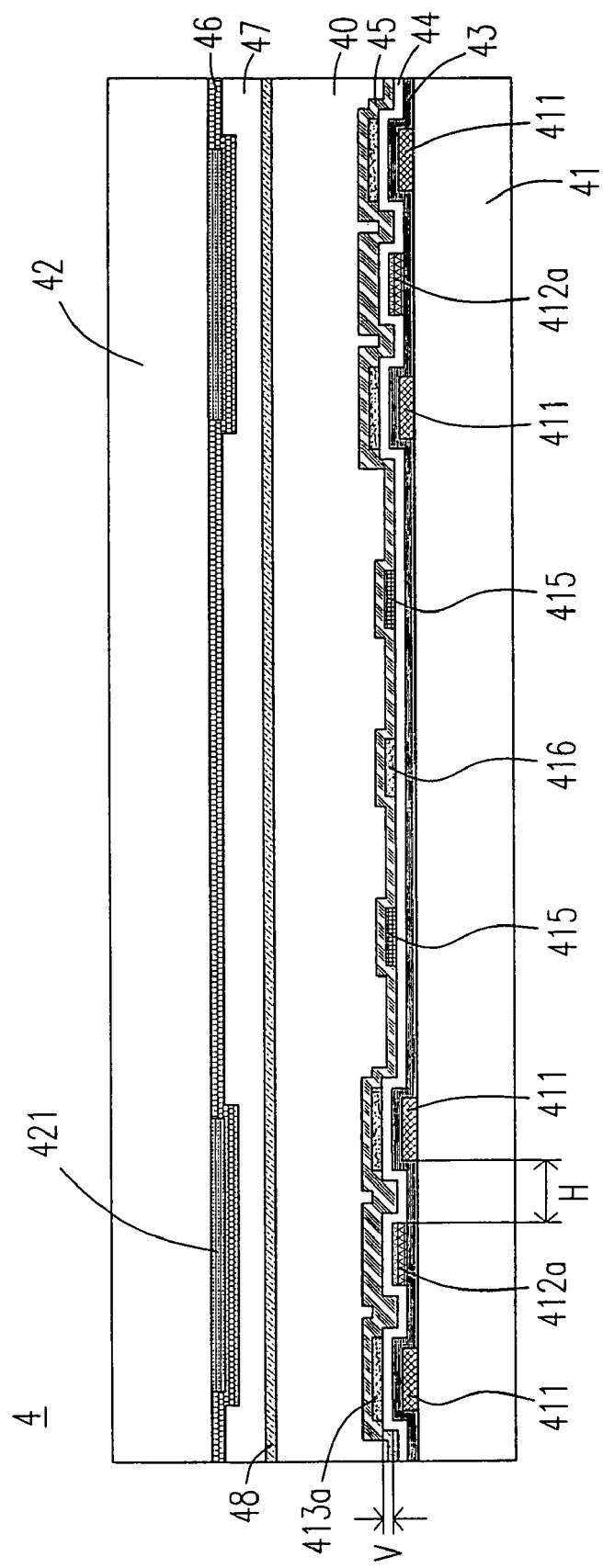

Please refer to FIGS. 4A and 4B, which are respectively the plan view and the cross-sectional view schematically showing the in-plane switching liquid crystal display according to a first embodiment of the present invention. The advanced super-no overcoat liquid crystal display (AS-NOOC LCD) 4 includes a first substrate 41 and a second substrate 42 that are faced to each other. On the first substrate 41, as shown in FIG. 4A, a plurality of electrodes including the shielding electrodes 411, the data lines 412a as well as the gate lines 412b and the first portion 413 (413a, 413b) of the common electrode are disposed. In more specific, each of the data lines 412a is positioned above and between the respective pair of shielding electrodes 411, and each of the first portion 413 of the common electrode has a first slit 414a and a second slit 414b whose positions are respectively corresponding to the data line 412a and the gate line 412b therebelow. Moreover, the first slit 414a and the second slit 414b are isolated to each other. Besides, the AS-NOOC LCD further includes at least one conductive line 420 spacing apart the gate lines.

As shown in FIG. 4B, which is a cross-sectional view taking along line A'-A" in FIG. 4A, the gate insulation layer 43, the data lines 412a as well as the gate lines 412b, the first passivation layer 44, the first portion 413 of the common electrode, the pixel electrodes 415, the second portion 416 of the common electrode and the first alignment layer, i.e. the first orientation layer 45, are fabricated on the first substrate 41. The second portion 416 of the common electrode is positioned between two of the pixel electrodes 415, and is applied with a common voltage as well as the first portion 413 (413a, 413b).

On the second substrate 42, the counter electrode 421, the color layer 46, the second passivation layer 47 and the second alignment layer, i.e. the second orientation layer 48, is fabricated thereon. The counter electrodes 421 are applied with a fixed voltage, and more preferably, with a common voltage, so that the horizontal electric field for the LC layer 40 interposed between the first substrate 41 and the second substrate 42 is enhanced. Such an effect will be illustrated later.

Preferably, the shielding electrodes 411 are applied with a fixed voltage or floating, so as to further shield the electric field of the data lines 412a. In addition, the opaque shielding electrodes 411 are capable of blocking the light leakage as well.

In this case, the conductive line 420 is applied with a common voltage, and the shielding electrodes 411 are floating or applied with a common voltage. The counter electrodes 421 are opaque electrodes for further preventing the light leakage as a black matrix (BM). As a preferred embodiment, the first portion 413 of the common electrode, the pixel electrodes 415 and the second portion 416 of the common electrode are transparent electrode. Moreover, the horizontal distance H which between each of the data lines and one of the pair of shielding electrodes is ranged from 0.1 to 10.0 μm, and the vertical distance V which between each of the data lines and a respective first portion is ranged from 0.1 to 2.8 μm.

Figure 5:
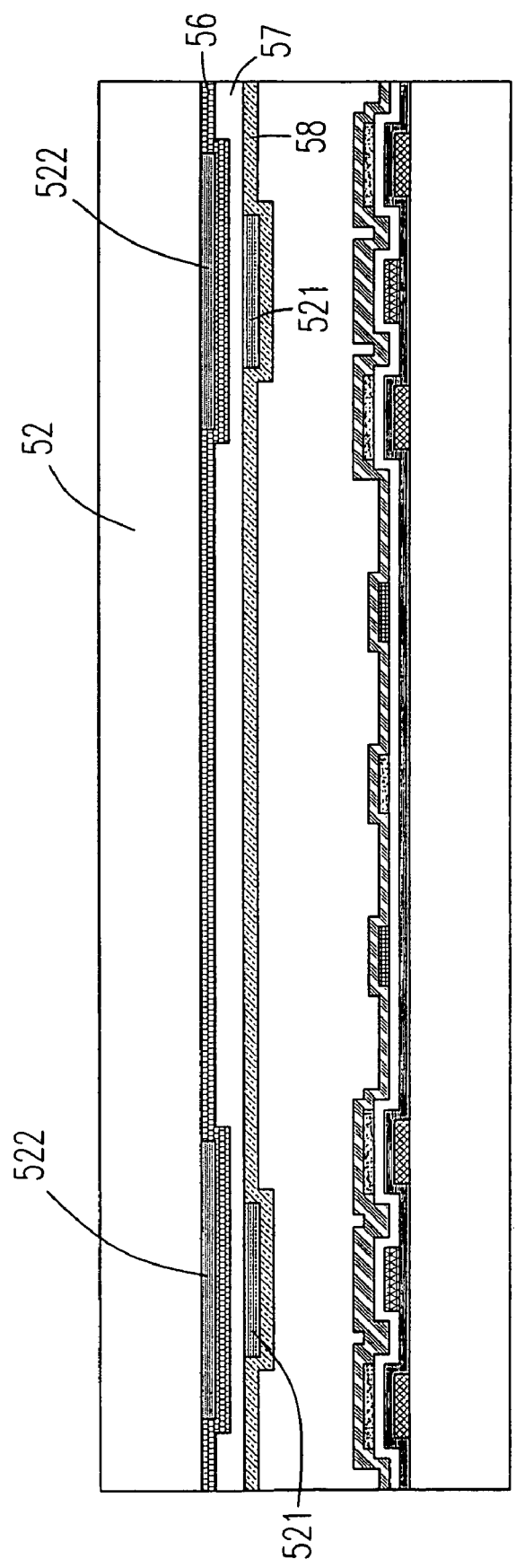
FIG. 5 is a cross-sectional view schematically showing the in-plane switching liquid crystal display according to a second embodiment of the present invention.

As an alternative, a counter electrode made of a transparent material is also preferred. Please refer to FIG. 5, which is the cross-sectional view schematically showing the in-plane switching liquid crystal display according to a second embodiment of the present invention. In this embodiment, the transparent counter electrodes 521 are applied with a fixed voltage or a common voltage for shielding the electric field of the data lines. In order to prevent the light leakage, a BM resin 522 is applied to the second substrate 52, and thereon the color layer 56 and the second passivation layer 57 are arranged in turns. The transparent counter electrodes 521 are disposed and corresponding to the respective data lines on the first substrate.

Figure 6:
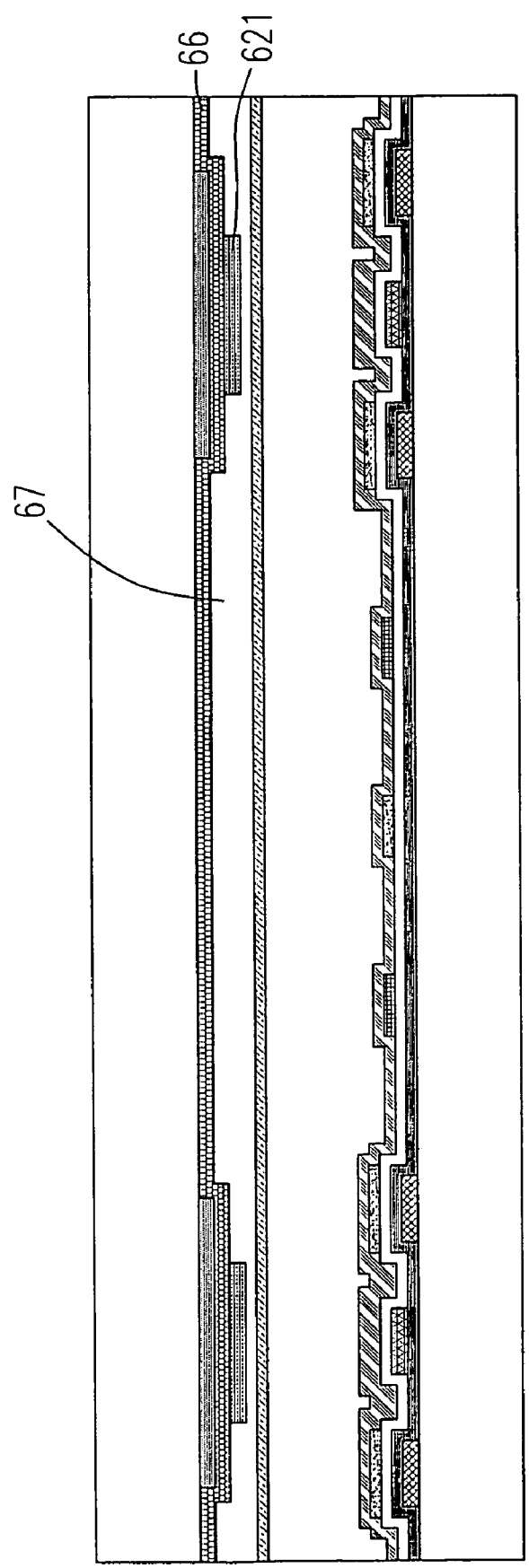
FIG. 6 is a cross-sectional view schematically showing the in-plane switching liquid crystal display according to a third embodiment of the present invention.

As a further alternative, the transparent counter electrode is covered with a passivation layer so as to be protected from the moisture. Please refer to FIG. 6, which is the cross-sectional view schematically showing the in-plane switching liquid crystal display according to a third embodiment of the present invention. In this embodiment, the transparent counter electrodes 621 are applied directly on the color layer 66, and are covered with a second passivation layer 67, so that a further protection for the counter electrodes 621 is achievable.

In addition to the arrangement of the counter electrode on the second substrate, the present invention is further advantageous in the various configuration and combination of the electrodes disposed on the first substrate. With reference to FIG. 4A, the first portion 413 of the common electrode is formed by the first portions 413a and 413b running in different directions that are corresponding to the data line 412a and the gate line 412b, respectively. As the above-mentioned, the first portions 413a and 413b have the respective slits 414a and 414b which are also positioned corresponding to the data line 412a and the gate line 412b for reducing the parasitic capacitance. In this embodiment, the first portions 413a and 413b are directly connected to each other, and form as a latticed electrode, so that a common voltage is applied thereon.

Figure 7:
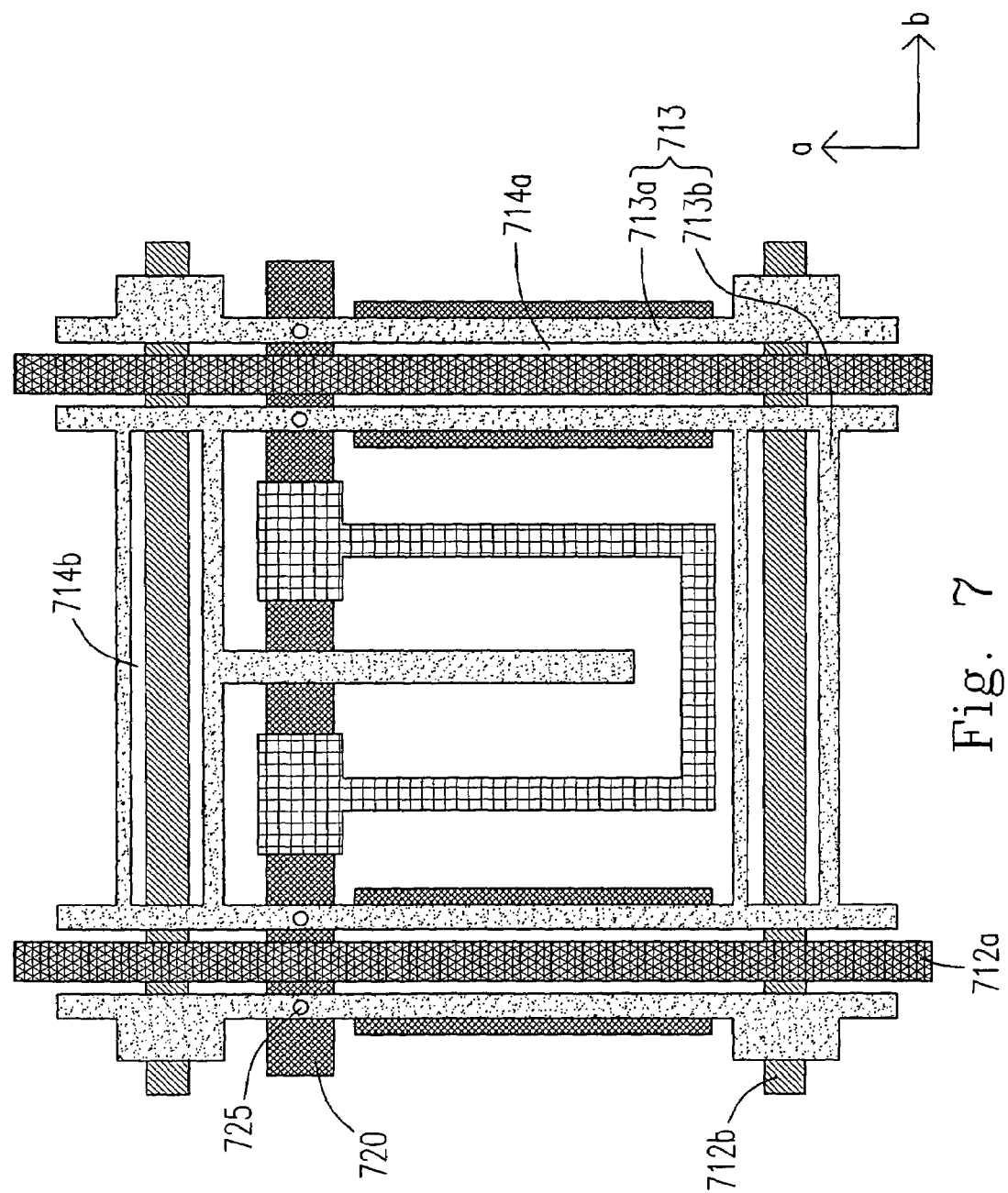
FIG. 7 is a plan view schematically showing the in-plane switching liquid crystal display according to a fourth embodiment of the present invention.

Please refer to FIG. 7, which is a plan view schematically showing the in-plane switching liquid crystal display according to a fourth embodiment of the present invention. In this embodiment, the first portions 713a and 713b of the common electrode running in different directions (a and b) that are corresponding to the data line 712a and the gate line 712b, respectively are partially separated. That is, the first slit 714a positioned above and corresponding to the data line 712a isolates each of two pixel areas that are adjacent in direction b, and the first slit 714a and the second slit 714b are isolated to each other. In this case, the AS-NOOC LCD further includes the contact hole 725 for connecting the conductive line 720 to the first portion 713a of the common electrode, so that a common voltage can be applied thereon.

Figure 8:
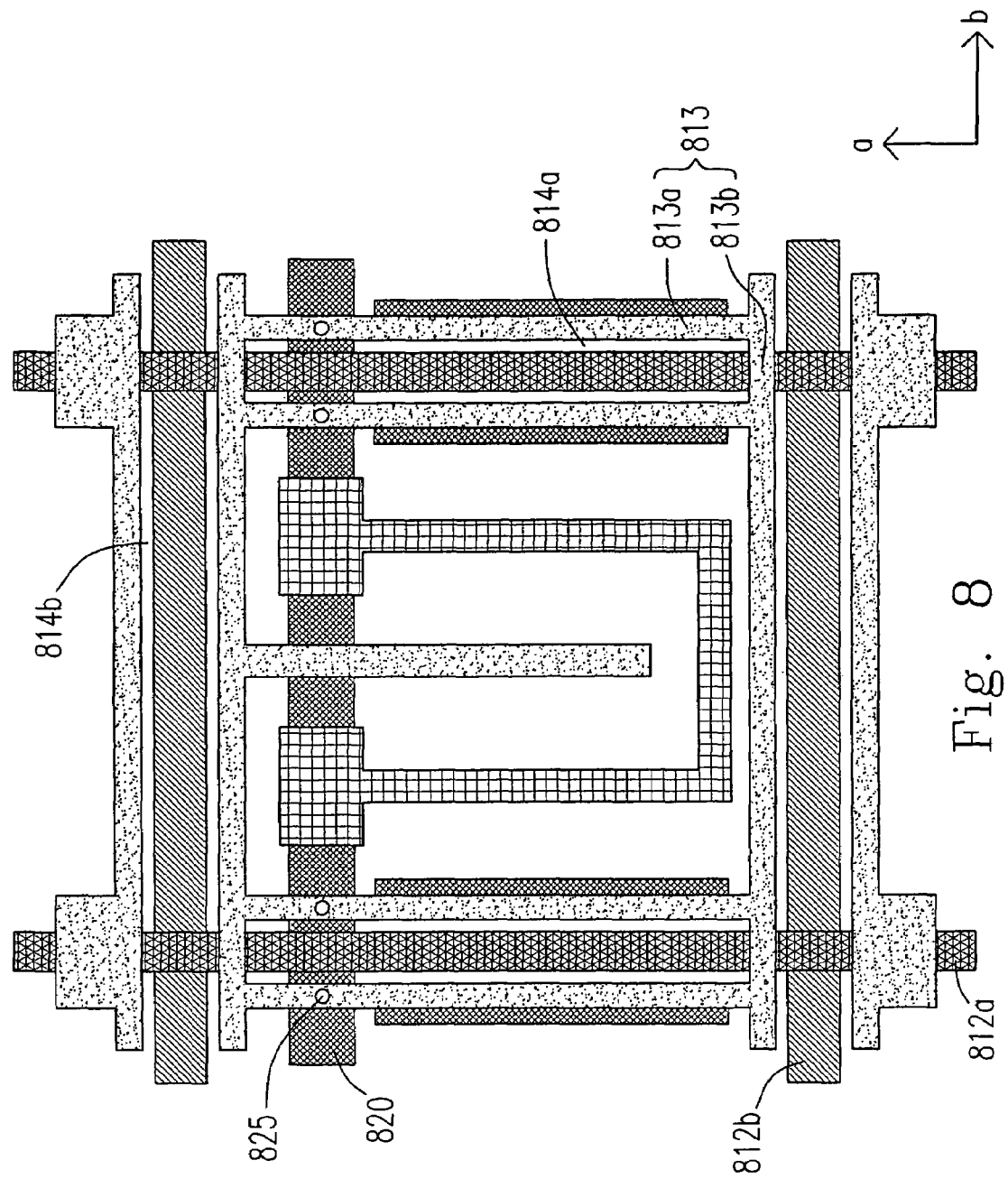
FIG. 8 is a plan view schematically showing the in-plane switching liquid crystal display according to a fifth embodiment of the present invention.

Please refer to FIG. 8, which is a plan view schematically showing the in-plane switching liquid crystal display according to a fifth embodiment of the present invention. In this embodiment, the first portions 813a and 813b of the common electrode running in different directions (a and b) that are corresponding to the data line 812a and the gate line 812b, respectively are partially separated. That is, the second slit 814b which is positioned above and corresponding to the gate line 812b isolates each of two pixel areas that are adjacent in direction a, and the first slit 814a and the second slit 814b are isolated to each other. In this case, the AS-NOOC LCD further includes the contact hole 825 for connecting the conductive line 820 to the first portion 813a of the common electrode, so that a common voltage can be applied thereon.

Figure 9:
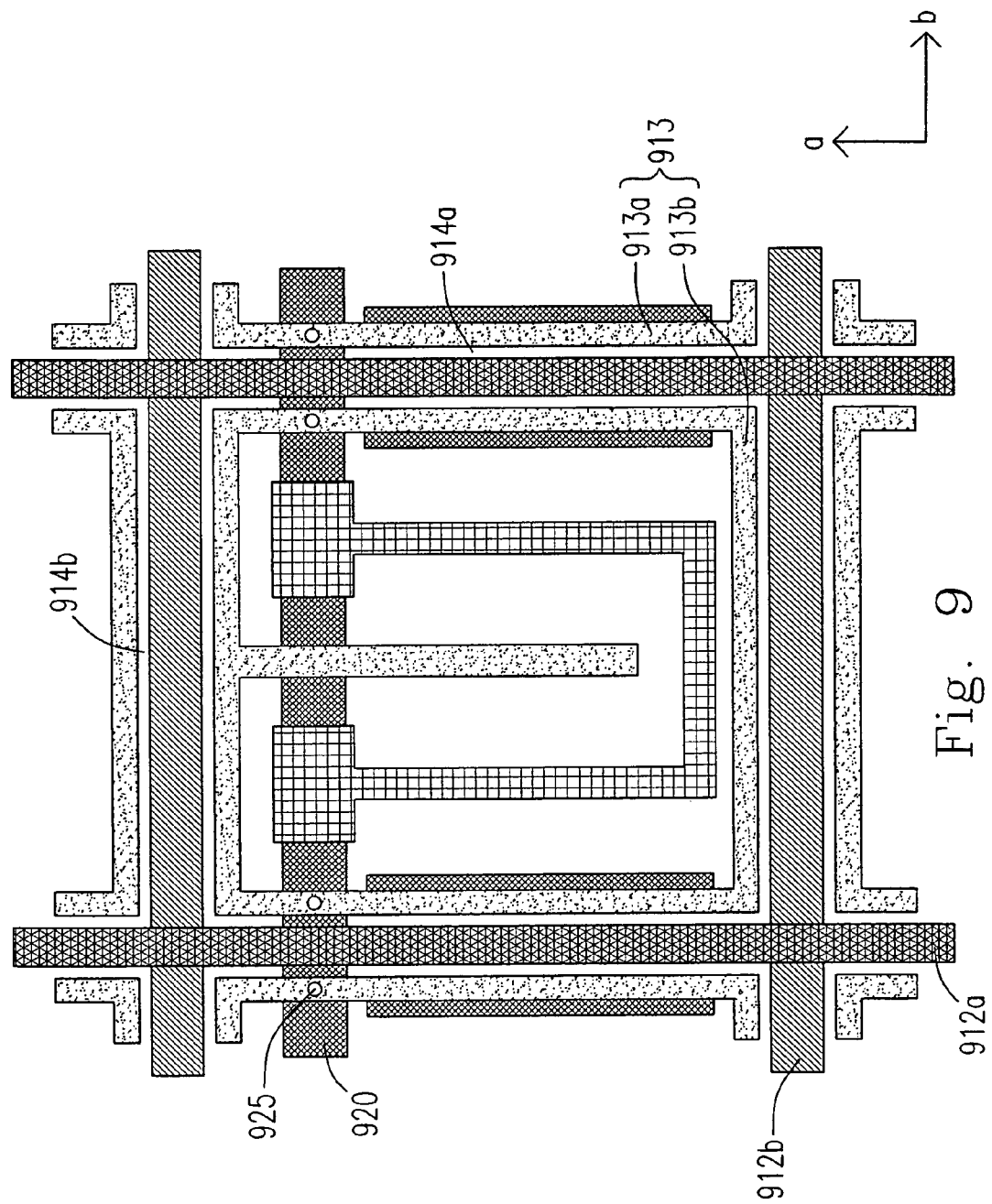
FIG. 9 is a plan view schematically showing the in-plane switching liquid crystal display according to a sixth embodiment of the present invention.

Please refer to FIG. 9, which is a plan view schematically showing the in-plane switching liquid crystal display according to a sixth embodiment of the present invention. In this embodiment, which is one of the preferred embodiments, the first portions 913a and 913b of the common electrode running in different directions (a and b) that are corresponding to the data line 912a and the gate line 912b, respectively are completely separated. That is, the first slit 914a and the second slit 914b respectively positioned above and corresponding to the data line 912a and the gate line 912b isolate all of the adjacent pixel areas from each other. As a result, for applying a common voltage on the separated first portion 913a and 913b, the first portions 913a and 913b of the common electrode are connected to the conductive line 920 through the contact hole 925.

Figure 10:
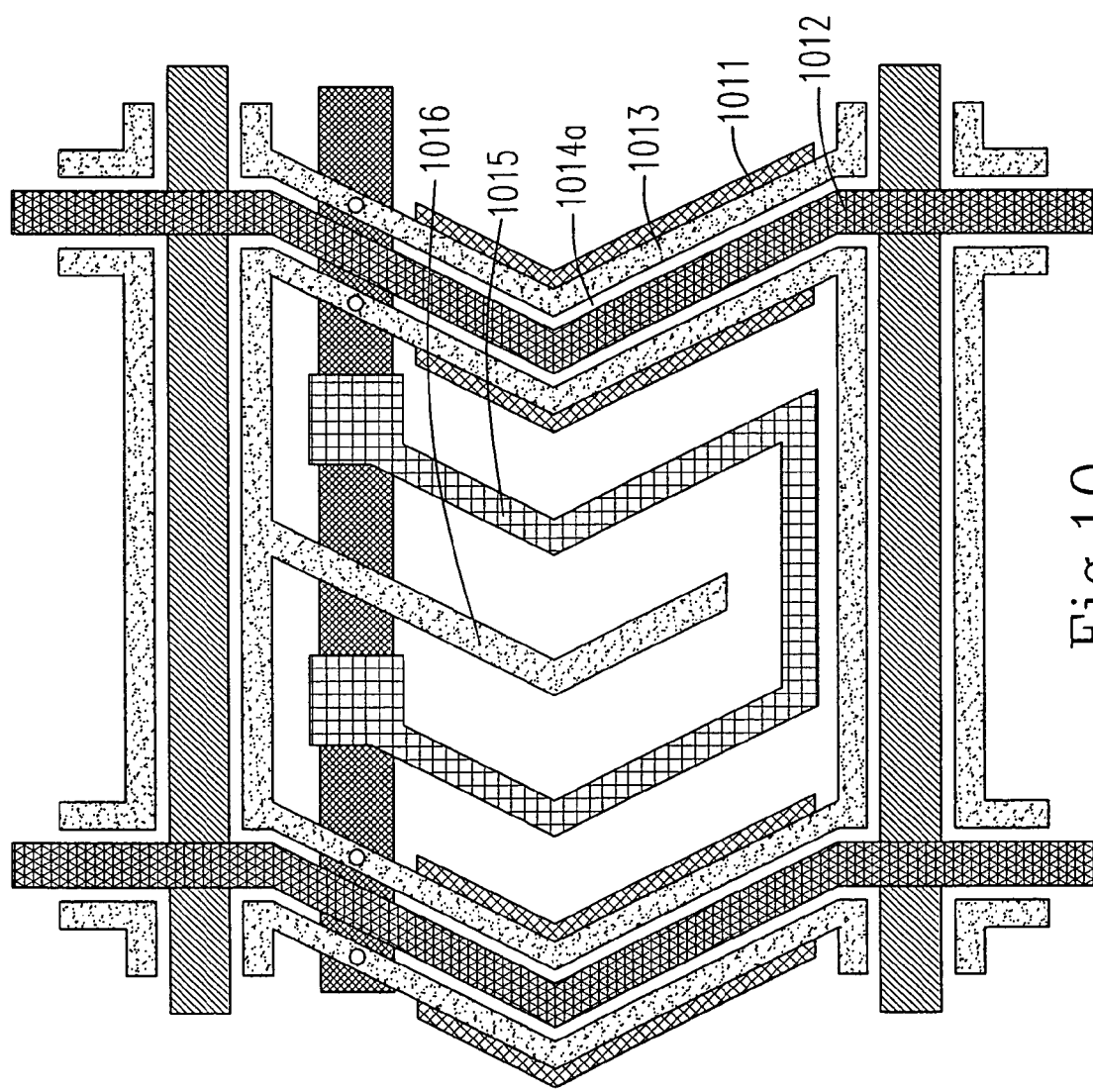
FIG. 10 is a plan view schematically showing the in-plane switching liquid crystal display according to a seventh embodiment of the present invention.

Please refer to FIG. 10, which is a plan view schematically showing the in-plane switching liquid crystal display according to a seventh embodiment of the present invention. In this embodiment, the shielding electrodes 1011, the data lines 1012, the first portion 1013 of the common electrode, the first slits 1014a on the first portion 1013, the pixel electrodes 1015 and the second portion 1016 of the common electrode are zigzag-shaped, so as to estimate the color shift of the LCD.

Figure 11A:
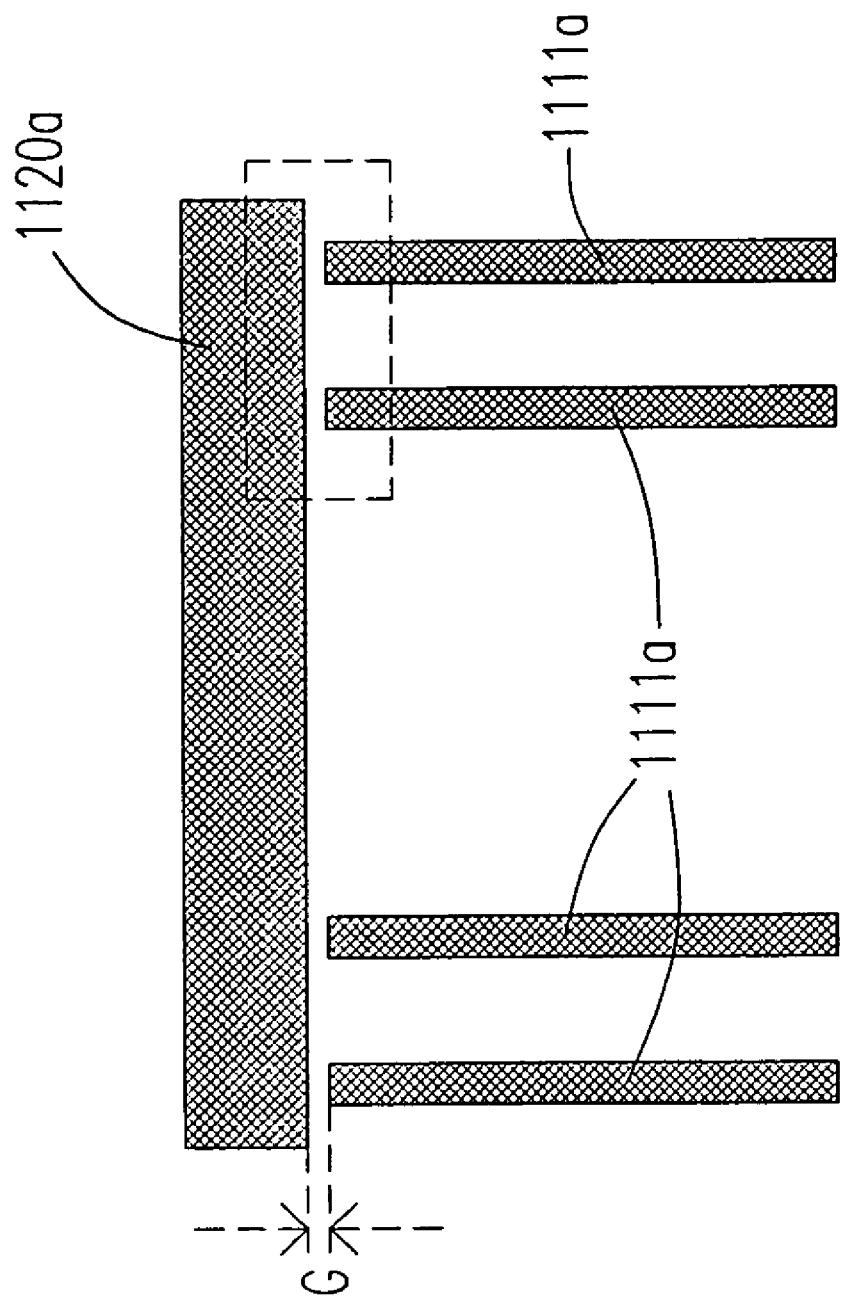
FIGS. 11A and 11B are plan views schematically showing two different configurations of the conductive line as well as the shielding electrodes of the in-plane switching liquid crystal display according to the present invention, respectively.
Figure 11B:
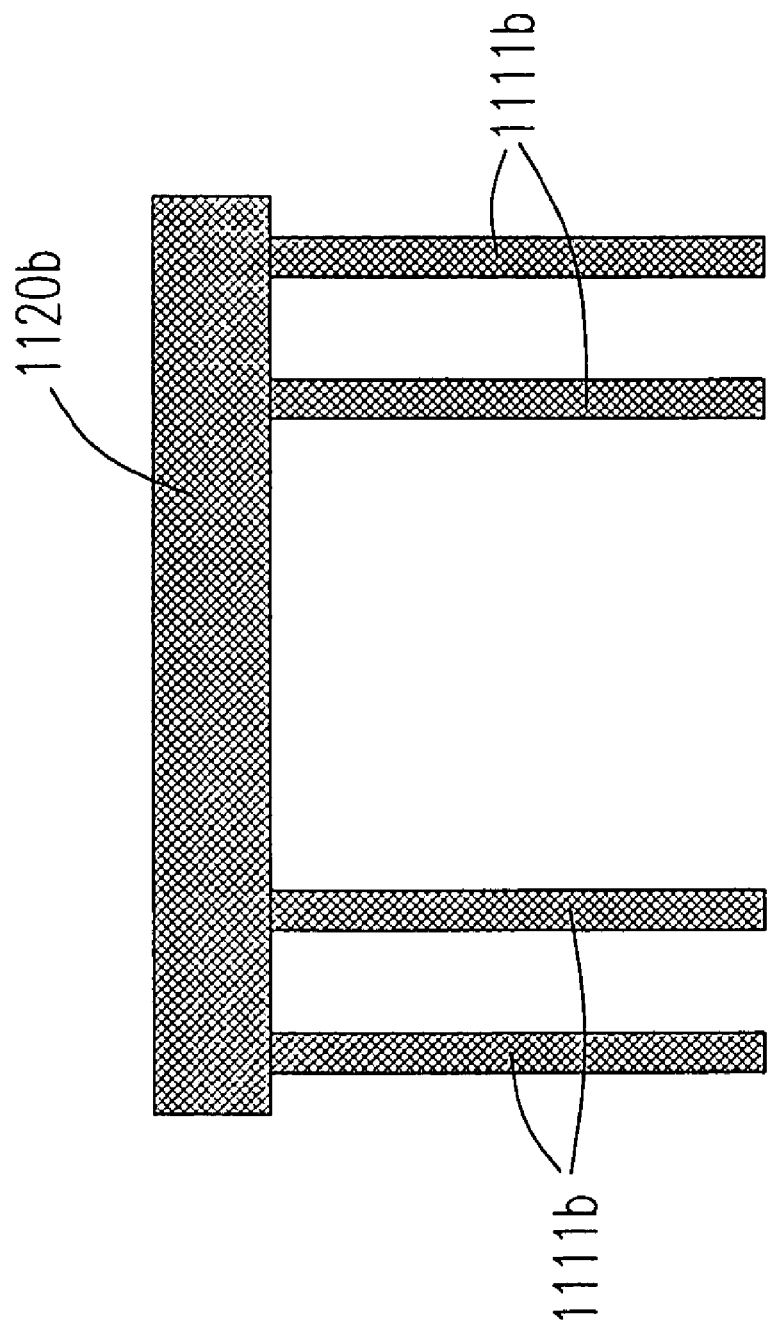

Please refer to FIGS. 11A and 11B, which are plan views schematically showing two different configurations of the conductive line as well as the shielding electrodes of the in-plane switching liquid crystal display according to the present invention, respectively. As shown in FIG. 11A, the shielding electrodes 1111a are separated from the conductive line 1120a and thus there exists a gap G between each of the shielding electrodes 1111a and the conductive line 1120a. Such a configuration is used for the mentioned embodiments. However, it is also preferable for the shielding electrodes 1111b to directly connect with the conductive line 1120b, such as the configuration shown in FIG. 11B.

Figure 12:
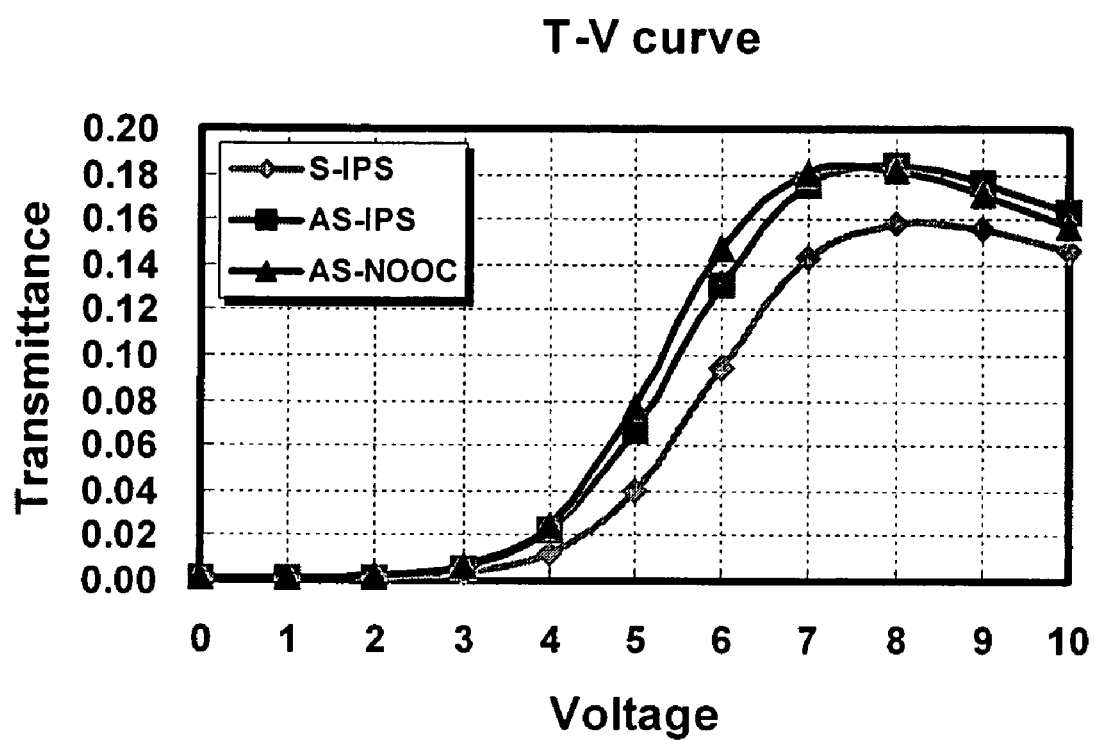
FIG. 12 is a diagram showing the respective relationships between the transmittance and the applied voltage for the S-IPS LCD, the AS-IPS LCD and the advanced super-no overcoat liquid crystal display (AS-NOOC LCD)

In the present invention, the optical and electrical properties of the S-IPS LCD, the AS-IPS LCD and the AS-NOOC LCD are respectively analyzed, so that the superiority of the AS-NOOC LCD of the present invention is provable. Please refer to FIG. 12, which shows the relationships between the transmittance at a bright state and the applied voltage for the S-IPS LCD, the AS-IPS LCD and the AS-NOOC LCD. As shown in FIG. 12, the transmittance of the AS-NOOC LCD is as high as that of the conventional AS-IPS LCD but has lower control voltage than the conventional AS-IPS LCD, while the AS-NOOC LCD is more advantages in its significantly reduced cost since the expensive organic overcoat layer is not necessary therefor. Moreover, in comparison with the S-IPS LCD, the transmittance of the AS-NOOC LCD is much higher. It is believed that such an enhancement in the transmittance for the AS-NOOC LCD is achieved by the optimization for the electrodes spacing.

Figure 13A:
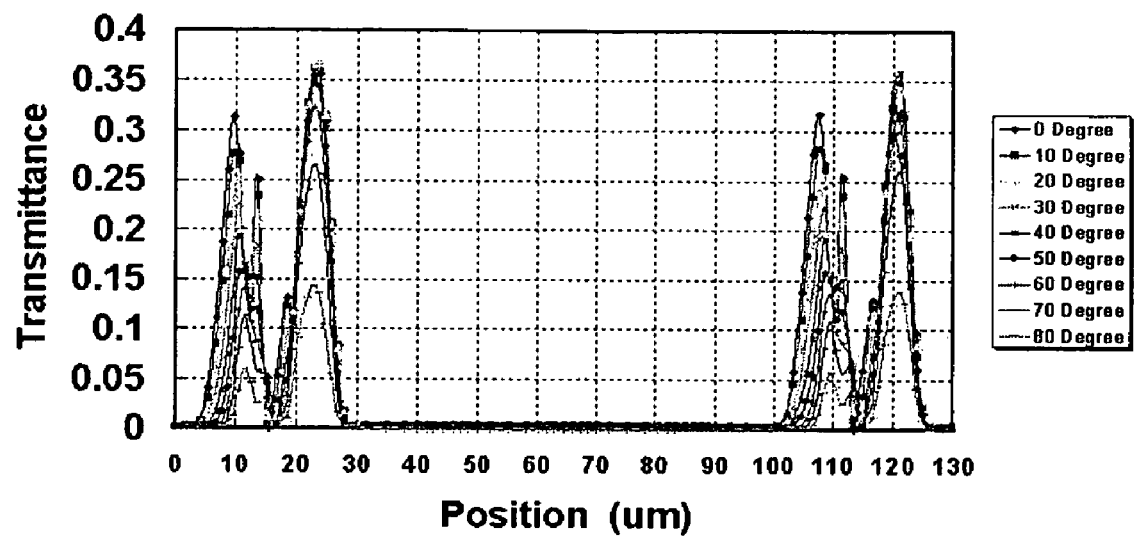
FIG. 13A is a diagram schematically showing the optical and electrical properties of a conventional S-IPS LCD.
Figure 13A:
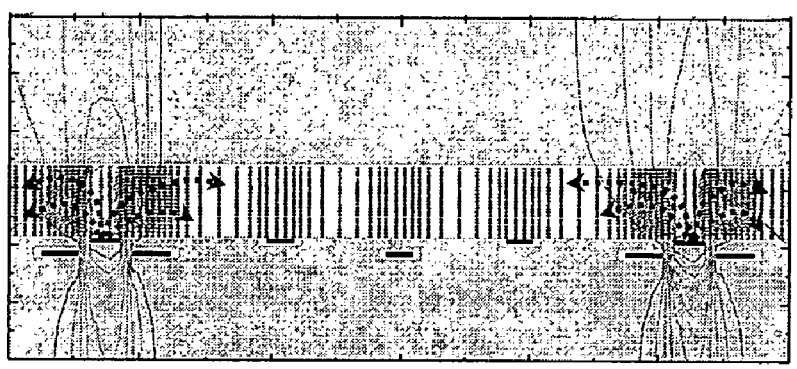
Figure 13B:
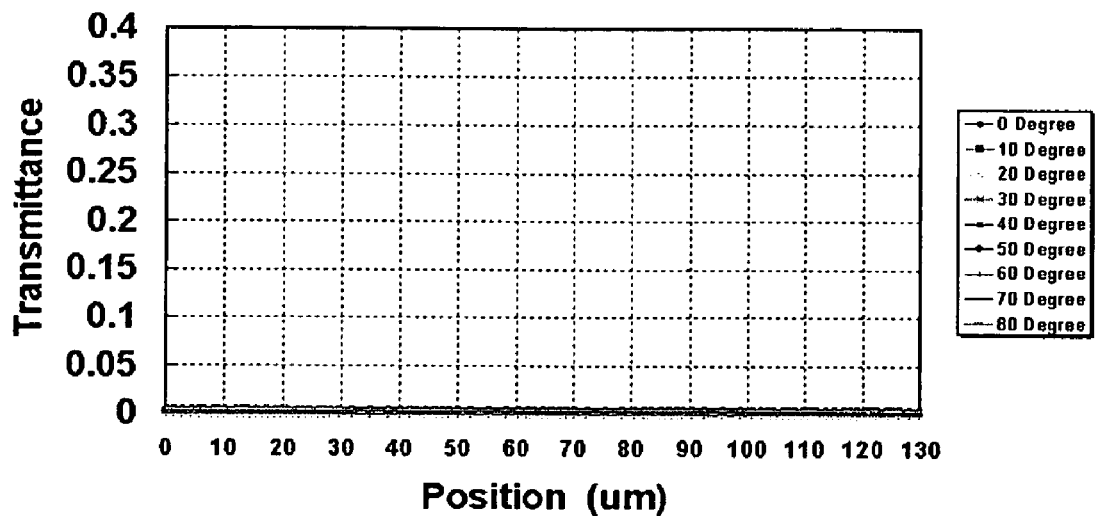
FIG. 13B is a diagram schematically showing the optical and electrical properties of a conventional AS-IPS LCD.
Figure 13B:
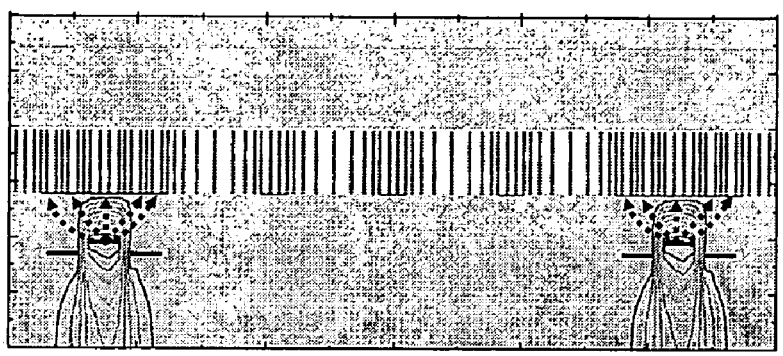
Figure 13C:
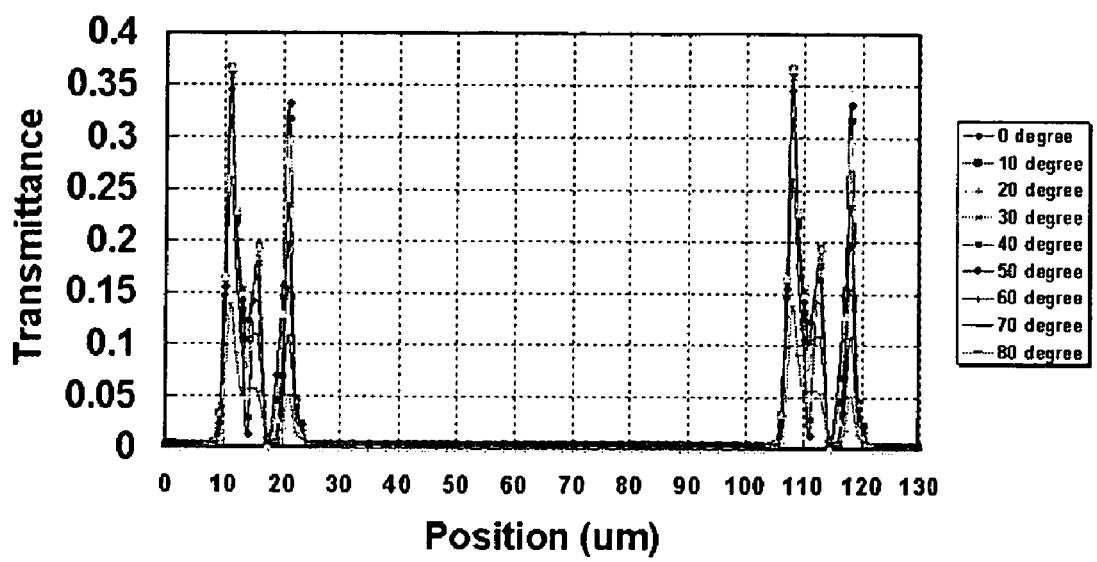
FIGS. 13C and 13D are diagrams schematically showing the optical and electrical properties of the AS-NOOC LCD according to the present invention.
Figure 13C:
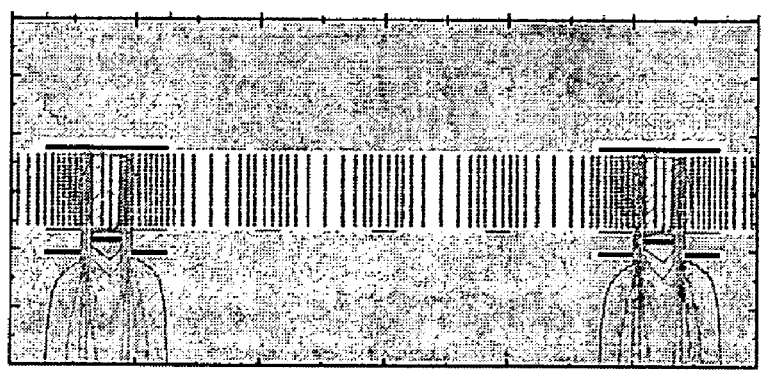
Figure 13D:
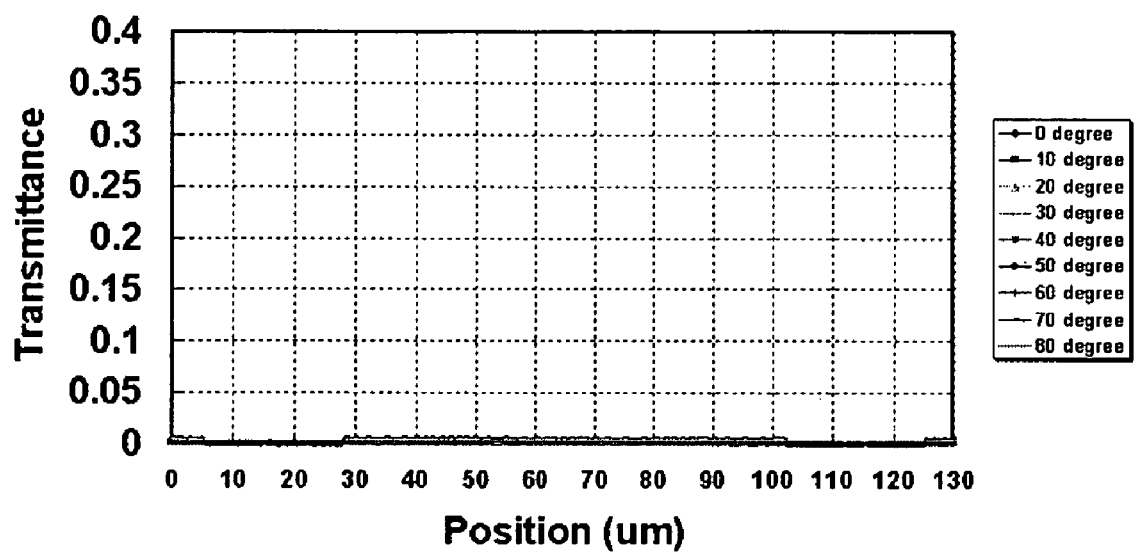
Figure 13D:
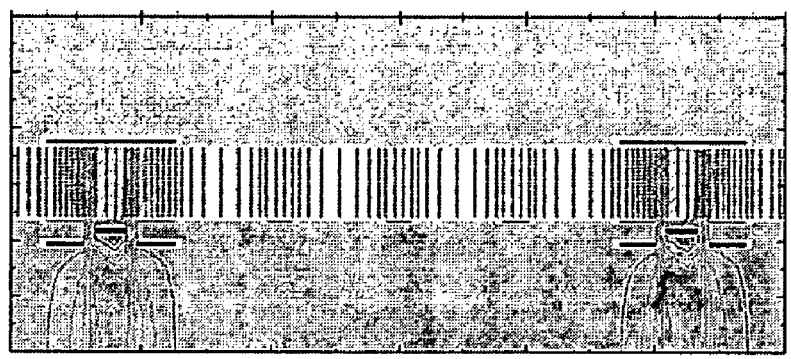

A further comparison among the respective optical and electrical properties of the S-IPS LCD, the AS-IPS LCD and the AS-NOOC LCD are shown in FIGS. 13A to 13D, in which FIG. 13A is a diagram schematically showing the optical and electrical properties of a conventional S-IPS LCD, FIG. 13B is a diagram schematically showing the optical and electrical properties of a conventional AS-IPS LCD, and FIGS. 13C and 13D are diagrams schematically showing the optical and electrical properties of the AS-NOOC LCD according to the present invention.

Please refer to FIG. 13A, which schematically shows the optical and electrical properties of a conventional S-IPS LCD, wherein all of the counter electrode, the shielding electrodes, the data lines, the common electrode including the first portion and the second portion, and the pixel electrodes are set as transparent electrodes for simulating. In this case, it is apparent that the light leakage region at the dark state is relatively large, i.e. in a position range of 5~30 82 m as well as 100~125 μm. This means a relatively large area of BM resin is necessary for the S-IPS LCD to avoid the light leakage problem, and thus the aperture ratio thereof is difficult to be improved. In addition, the iso-potential lines for the S-IPS LCD are divergent, which may inversely affect the arrangement of the LC molecules therein.

Please refer to FIG. 13B, which schematically shows the optical and electrical properties of a conventional AS-IPS LCD. Similarly, all of the counter electrode, the shielding electrodes, the data lines, the common electrode including the first portion and the second portion, and the pixel electrodes of the AS-IPS LCD are set as transparent electrodes for simulating. In this case, there is no light leakage being observed at the dark state. However, for overcoming the drawback of RC delay, it needs to apply a thicker organic overcoat layer for the AS-IPS LCD, and such an application would result in an undesired capacitance coupling effect on the pixel electrode.

Please refer to FIG. 13C, which schematically shows the optical and electrical properties of the AS-NOOC LCD according to the present invention, wherein all of the counter electrode, the shielding electrodes, the data lines, the common electrode including the first portion and the second portion, and the pixel electrodes are also set as transparent electrodes for simulating. Regarding the optical property of the AS-NOOC LCD, it is apparent that the light leakage region, i.e. in a position range of 10~25 μm as well as 105~120 μm, is much smaller than that of the conventional S-IPS LCD. It is advantageous in that the area of the essential BM or BM resin for the AS-NOOC LCD is efficiently reduced, and thus a benefit for the production cost is also achievable. Furthermore, regarding the most preferred embodiment, in which all of the counter electrode, the shielding electrodes and the data lines are opaque, but the common electrodes and the pixel electrodes are both transparent, it is apparent that the light leakage thereof is completely reduced, as shown in FIG. 13D.

In comparison with the AS-IPS LCD, the RC delay of the AS-NOOC LCD is also reduced by the common electrodes with slit holes and the shielding electrode as well as the counter electrode thereof, so that the application of overcoat layer is not necessary. Therefore, the production cost for the AS-NOOC LCD is much lower, and the yield thereof is further improved.

Additionally, it is worthy to mention that the types of the metallic electrodes of the AS-NOOC LCD are variable, which depends on an actual practice therefor.

Based on the above, a novel in-plane switching liquid crystal display is provided in the present invention. Through the arrangement of shielding electrodes as well as the counter electrode, the coupling effect of the applied pixel voltage on the data lines is shielded. Therefore, the crosstalk problem is solved and the RC delay is effectively reduced. Through the present invention, the light leakage from an oblique angle is also prevented and the cell transmittance is kept as high as that of the AS-IPS LCD. Besides, it is not necessary for such a display to arrange an overcoat layer therein, and this brings not only a significantly lower production cost, but also an improvement in the yield.

Hence, the present invention not only has novelty and progressiveness, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. An in-plane switching liquid crystal display comprising:
    a first substrate, a second substrate and a liquid crystal layer sandwiched between the first substrate and the second substrate;
    a plurality of gate lines and data lines disposed on the first substrate and intersected to each other, so as to form a pixel surrounded thereby;
    a counter electrode disposed on the second substrate and corresponding to one of the data lines;
    a pixel electrode disposed in the pixel and on the first substrate;
    a pair of shielding electrodes disposed on the first substrate, wherein one of the data lines is located between the shielding electrodes; and
    a common electrode having a first portion and a second portion disposed on the first substrate, wherein the first portion has a first slit corresponding to one of the data lines, and the second portion is located inside the pixel and adjacent to the pixel electrode, wherein a width of the first slit is parallel with one of the gate lines and larger than a width of the data line, and wherein a horizontal distance between one of the data lines and the corresponding pair of shielding electrodes is ranged from 0.1 to 10.0 μm.

2. The in-plane switching liquid crystal display according to claim 1, wherein the first portion has a second slit corresponding to one of the gate lines.

3. The in-plane switching liquid crystal display according to claim 2, wherein the first slit and the second slit are isolated to each other.

4. The in-plane switching liquid crystal display according to claim 1, further comprises a conductive line spacing apart the gate lines.

5. The in-plane switching liquid crystal display according to claim 4, wherein the shielding electrodes are connected to the conductive line.

6. The in-plane switching liquid crystal display according to claim 4, further comprises a contact hole connecting the conductive line to the first portion.

7. The in-plane switching liquid crystal display according to claim 4, wherein the conductive line is applied with a common voltage.

8. The in-plane switching liquid crystal display according to claim 1, wherein the shielding electrodes are floating.

9. The in-plane switching liquid crystal display according to claim 1, wherein the counter electrode are applied with one of a fixed voltage and a common voltage.

10. The in-plane switching liquid crystal display according to claim 1, wherein the first portion is a transparent electrode.

11. The in-plane switching liquid crystal display according to claim 1, wherein the second portion is a transparent electrode.

12. The in-plane switching liquid crystal display according to claim 1, wherein the pixel electrode is a transparent electrode.

13. The in-plane switching liquid crystal display according to claim 1, wherein the shielding electrodes are opaque electrodes.

14. The in-plane switching liquid crystal display according to claim 1, wherein the counter electrode is an opaque electrode.

15. The in-plane switching liquid crystal display according to claim 1, wherein the counter electrode is a transparent electrode.

16. The in-plane switching liquid crystal display according to claim 15, further comprises a BM resin disposed between the second substrate and the counter electrode.

17. The in-plane switching liquid crystal display according to claim 16, wherein the BM resin is zigzag-shaped.

18. The in-plane switching liquid crystal display according to claim 1, wherein one of the counter electrode, the shielding electrodes, the data lines, the first portion, the second portion and the pixel electrode is zigzag-shaped.

19. The in-plane switching liquid crystal display according to claim 1, further comprises a vertical distance between one of the data lines and the first portion, wherein the vertical distance is ranged from 0.1 to 2.8 µm.

* * * * *